United States Patent [19]

Love et al.

[11] 4,307,399
[45] Dec. 22, 1981

[54] CIRCUIT FOR DETECTING AND HOMING ON CONTINUOUS WAVE RADAR TARGETS

[75] Inventors: Phillip A. Love; Gabriel S. Borunda, both of Riverside, Calif.

[73] Assignee: The United State of America as represented by the Secretary of the Navy, Washington, D.C.

[21] Appl. No.: 628,806

[22] Filed: Apr. 3, 1967

[51] Int. Cl.³ .................. G01S 13/28; G01S 13/44
[52] U.S. Cl. .................. 343/16 M; 343/17.2 PC
[58] Field of Search .................. 343/165 D, 13, 17.2, 343/17.2 PC, 100.7, 16 M; 340/3 D; 367/100

[56] References Cited
U.S. PATENT DOCUMENTS

| 2,624,876 | 1/1953 | Dicke | 343/17.2 UX |
| 3,229,286 | 1/1966 | Samuel et al. | 343/17.2 X |
| 3,257,638 | 6/1966 | Kritz et al. | 340/3 |
| 3,303,497 | 2/1967 | Chubb | 343/17.2 X |

Primary Examiner—Malcolm F. Hubler
Attorney, Agent, or Firm—Richard S. Sciascia; Joseph M. St. Amand; T. M. Phillips

[57] ABSTRACT

An apparatus for providing increased homing capabilities in a guided missile seeker against a continuous wave radar signal by compressing the received signal which effectively increases the received signal level by more than twenty decibels.

2 Claims, 5 Drawing Figures

CIRCUIT FOR DETECTING AND HOMING ON CONTINUOUS WAVE RADAR TARGETS

The invention herein described may be manufactured and used by or for the Government of the United States of America for governmental purposes without the payment of any royalties thereon or therefor.

BACKGROUND

The present invention relates to missile guidance systems and more particularly to the seeker portion of a guided missile system wherein homing on a continuous wave radar is attained. The peak power of a continuous wave (CW) radar signal is considerably less than most pulsed radars. In order to obtain a tracking range capability against CW radar targets, comparable to that against pulse radar targets all of the CW power must be utilized. In order to utilize a seeker which is capable of tracking both pulse and CW radars, various means have been devised. One means has been to chop the received CW signal into pulses which can be processed by the pulse signal processor. The capability of the seeker is then reduced because a large portion of the already small received signal power is lost when the CW signal is chopped into pulses.

SUMMARY

The present invention provides a means for changing the CW radar signal into pulses and at the same time increasing the signal to noise ratio by proportions which increase the effective range of the seeker as if the signal were of the pulse radar type. The pulsing of the CW signal is accomplished by linearly sweeping the local oscillator with a sawtooth waveform and passing the signal through a pulse compression filter. The output signal is then a series of pulses which can be processed in the same manner as a pulsed radar signal.

Many of the attendant advantages of this invention will become readily appreciated as the same becomes better understood by reference to the following detailed description when considered in connection with the accompanying drawings wherein.

Figure 1:
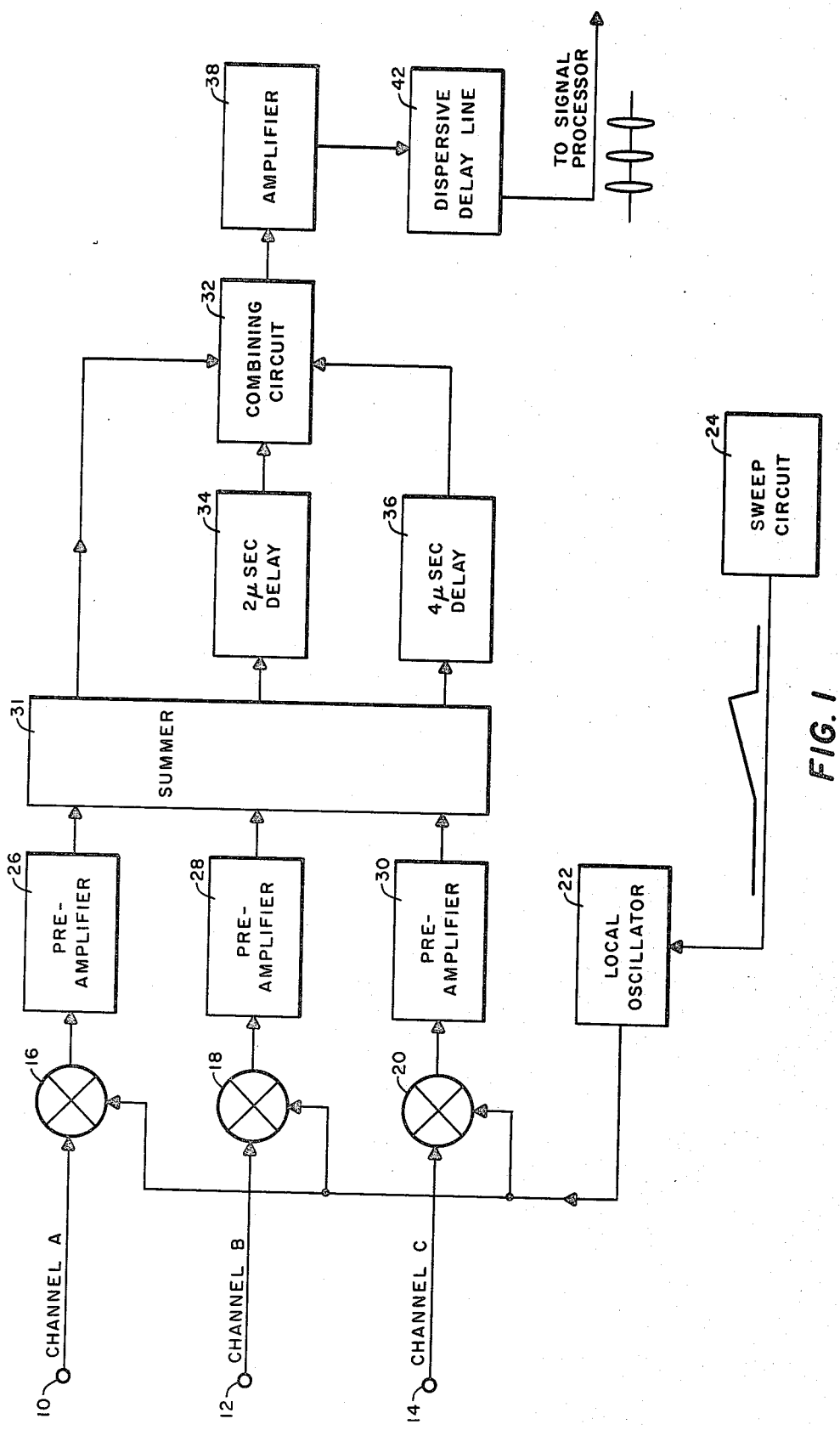
FIG. 1 is a block diagram of a preferred embodiment of the invention.
Figure 2:
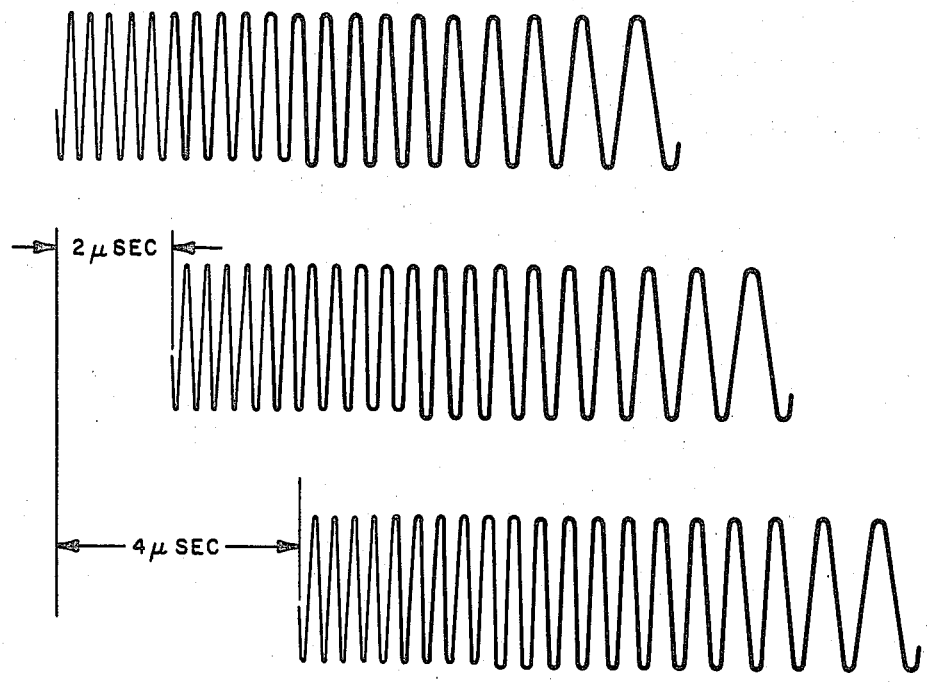
FIG. 2 is a graph showing overlapping swept CW signals.

Referring now to the drawings there is shown in FIG. 1 three input terminals, 10, 12, and 14 for receiving respectively reference signal $\Sigma$, the pitch difference signal $\Delta p$, and the yaw difference signal $\Delta y$ from the antenna-RF systems (not shown). Input signals $\Sigma$, $\Delta p$, and $\Delta y$ are fed respectively to mixers 16, 18, and 20 where they are mixed with the output signal from local oscillator 22 which is swept by a sawtooth wave from sweep circuit 24. The IF signals out of mixers 16, 18, and 20 are fed respectively to pre-amplifiers 26, 28, and 30. The output of pre-amplifier 26 is summed with the outputs of pre-amplifiers 28 and 30 to produce $\Sigma$, $\Sigma \pm \Delta p$, and $\Sigma \pm \Delta y$ signals. The $\Sigma \pm \Delta p$ signal is fed through a 2 $\mu$sec delay circuit 34; and the $\Sigma \pm \Delta y$ signal is fed through a 4 $\mu$sec delay circuit 36. The three swept signals are then combined into one channel in combining circuit 32. The combiner output is amplified by amplifier 38 and fed to the dispersive delay line 42. The output of dispersive delay line is a series of pulses (FIG. 5) which are fed to a signal processor (not shown).

Figure 3:
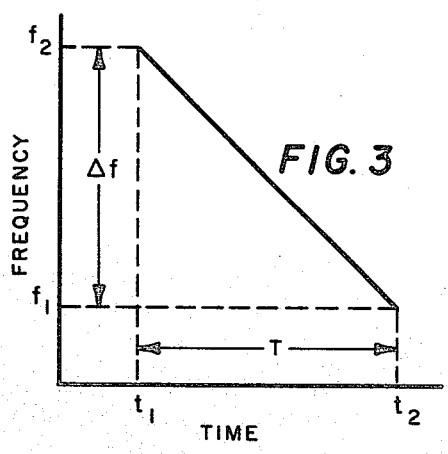
FIG. 3 is a graph showing swept CW signal characteristic.
Figure 5:
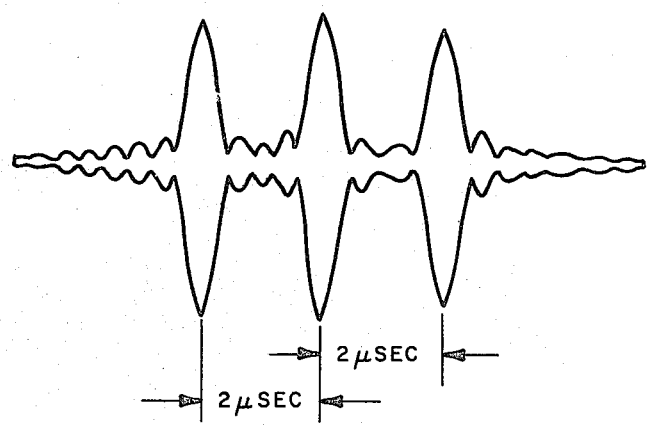
FIG. 5 is a graph showing the resultant output of the circuit of FIG. 1.
Figure 4:
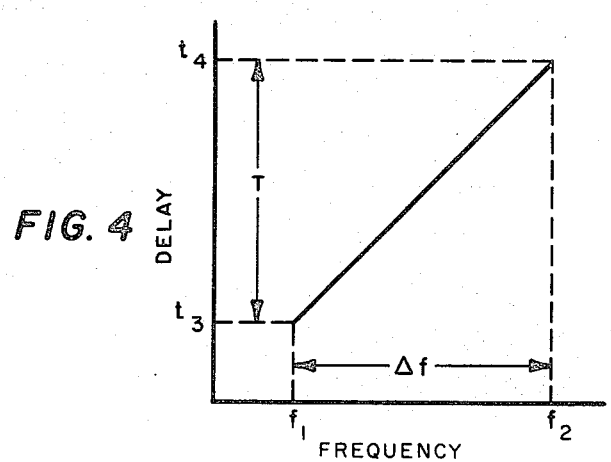
FIG. 4 is a graph showing pulse compression filter characteristic.

In operation, the dispersive delay line 42 makes use of a characteristic found in stainless steel where the propagation time of an ultrasonic wave is found to vary linearly with frequency, FIG. 4. Electrical energy is converted to mechanical energy by a transducer at one end of the line and the resulting ultrasonic wave is propagated down the metal strip to be reconverted to electrical energy in a similar transducer at the other end of the line. When the input frequency is swept linearly, as shown in FIG. 3, from $f_2$ to $f_1$, during a time interval, T, which is a function of the dispersive delay line, the linear time delay characteristics of the dispersive delay line 42, FIG. 4, act to delay the high frequency components of the swept pulses more than the low frequency components. Components having frequencies in between experience a proportional delay. The result is a time compression of the input signal into a sin X pulse/X, as seen in FIG. 5 (any noise contained in the signal has random phase characteristics; consequently, it arrives randomly at the output of the dispersive delay line and does not compress). The increase in peak power of the compressed pulse is proportional to the ratio of widths of the input and output signals as expressed in equation one.

$$Po/Pi = T/\tau \ TM \ (1)$$

where
 Po = output pulse peak power
 Pi = input pulse peak power
 T = input pulse duration
 $\tau$ = output pulse duration at the four db point The output pulse width is measured at a point four db below the peak of the main lobe. This corresponds to the width of a rectangular pulse that contains the same peak power as the Sin X/X pulse.

The three signals received at terminals 10, 12, and 14 (FIG. 1), are mixed with the swept local oscillator to produce swept IF signals that are fed to IF pre-amplifiers 26, 28, and 30. The pre-amplifiers should be operated to accept the longer duration signals to correspond to the dispersion time of dispersive delay line 42. Local oscillator 22 should be swept by the output of sweep circuit 24 in such a manner that its output, when heterodyned with the target frequency, falls within the linear portion of the delay line characteristic of dispersive delay line 42.

Obviously many modifications and variations of the present invention are possible in the light of the above teachings. It is therefore to be understood that within the scope of the appended claims the invention may be practiced otherwise than as specifically described.

What is claimed is:

1. In an improved circuit for detecting and homing on continuous wave radar targets with a monopulse seeker, the combination comprising:
   (a) first, second, and third input terminals for receiving respectively, reference signal, $\Sigma$, pitch difference signal, $\Delta p$, and yaw difference signal $\Delta y$,
   (b) a sawtooth wave generator circuit for generating a sawtooth wave signal, (c) local oscillator circuit means coupled to said sawtooth wave generator and producing an output signal varying linearly in frequency, (d) first, second, and third mixer circuits respectively, each having a first input coupled respectively to said first, second, and third input terminals and having a second input coupled to said local oscillator for producing output IF signals, (e) a summing circuit coupled to the outputs of said first, second, and third mixer circuits for producing a sum signal, $\Sigma$, a sum signal $\pm$ pitch differential signal, $\Sigma \pm \Delta p$, and a sum signal $\pm$ yaw difference signal, $\Sigma \pm \Delta y$, signals, (f) a combining circuit having first, second, and third inputs and an output, (g) circuit means coupling said $\Sigma$ signal directly to the first input of said combining circuit, (h) a first delay line coupling said $\Sigma \pm \Delta p$ signal to the second input of said combining circuit, (i) a second delay line having a delay longer than the delay of said first delay line coupling said $\Sigma \pm \Delta y$ signal to the third input of said combining circuit, (j) a dispersive delay line coupled to the output of said combining circuit for compressing the three frequency swept signals into a series of three narrow pulses with the second and third pulses delayed from the first pulses respectfully by the amount of the delays of said first and second delay lines.

2. In an improved circuit for detecting and homing on continuous wave radar targets with a monopulse seeker, the combination comprising:

(a) first, second, and third input terminals for receiving respectively, reference signal, $\Sigma$, pitch difference signal, $\Delta p$, and yaw difference signal $\Delta y$, (b) a sawtooth wave generator for generating a sawtooth wave signal, (c) a local oscillator coupled to said sawtooth wave generator for producing linearly frequency swept signal, (d) first, second, and third mixer circuits respectively, each having a first input coupled respectively to said first, second, and third input terminals and having a second input coupled to said local oscillator for producing output IF signals, (e) a summing circuit coupled to the outputs of said first, second, and third mixer circuits for producing a sum signal, $\Sigma$, a sum signal $\pm$ pitch differential signal, $\Sigma \pm \Delta p$, and a sum signal $\pm$ yaw difference signal, $\Sigma \pm \Delta y$, signals, (f) a combining circuit having first, second, and third inputs and an output, (g) circuit means coupling said $\Sigma$ signal directly to the first input of said combining circuit, (h) a two micro-second delay line coupling said $\Sigma \pm \Delta p$ signal to the second input of said combining circuit, (i) a four micro-second delay line coupling said $\Sigma \pm \Delta y$ signal to the third input of said combining circuit, (j) a dispersive delay line coupled to the output of said combining circuit for compressing the three frequency swept signals into a series of three narrow pulses with the second and third pulses delayed from the first pulse respectively by two and four micro-seconds.

* * * * *